(No Model.) 2 Sheets—Sheet 1.
O. O. ELSASSER.
DEVICE FOR REDUCING THE ENDS OF METAL RODS.
No. 515,328. Patented Feb. 27, 1894.
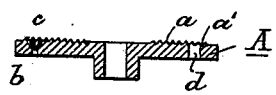
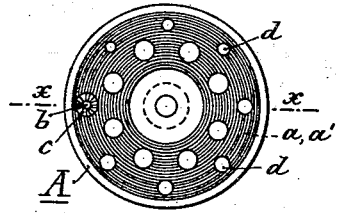
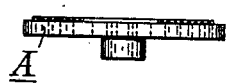
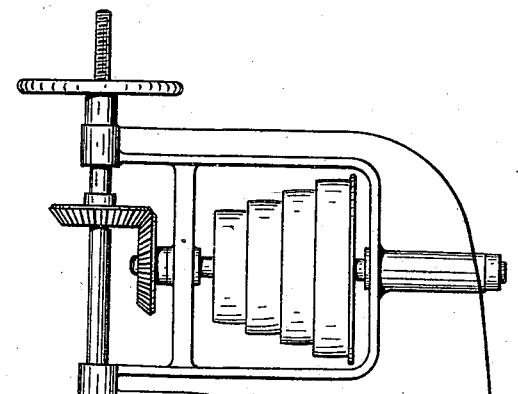
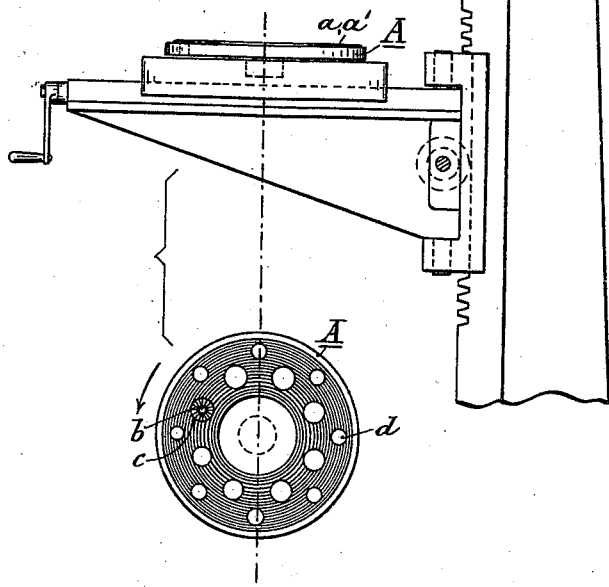
Attest
[signatures]
F. L. Middleton
Inventor
Oscar Otto Elsasser
By Richards & Co
Attys
THE NATIONAL LITHOGRAPHING COMPANY,
WASHINGTON, D. C.

(No Model.) 2 Sheets—Sheet 2.
O. O. ELSASSER.
DEVICE FOR REDUCING THE ENDS OF METAL RODS.
No. 515,328. Patented Feb. 27, 1894.
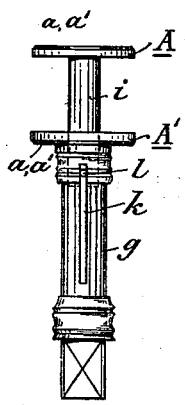
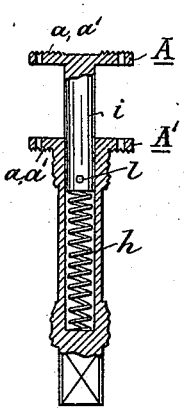
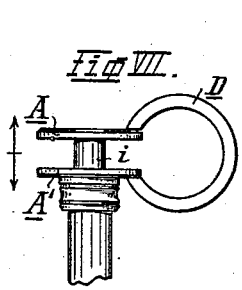
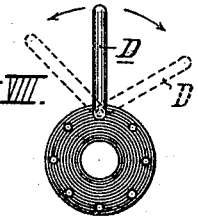
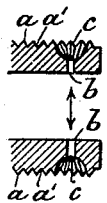
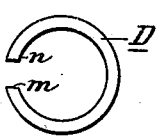
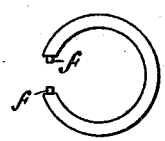
Attest
Inventor
Oscar Otto Elsasser
by Richards & Co.

UNITED STATES PATENT OFFICE.

OSCAR OTTO ELSASSER, OF BERLIN, GERMANY, ASSIGNOR TO FRIEDRICH WILHELM THEODOR BRAEUNIG, OF SAME PLACE.

DEVICE FOR REDUCING THE ENDS OF METAL RODS.

SPECIFICATION forming part of Letters Patent No. 515,328, dated February 27, 1894.

Application filed June 20, 1893. Serial No. 478,215. (No model.)

*To all whom it may concern:*

Be it known that I, OSCAR OTTO ELSASSER, watchmaker, a subject of the King of Prussia, German Emperor, residing at the city of Berlin, in the Kingdom of Prussia, Germany, have invented certain new and useful Improvements in Devices for Reducing the Ends of Metal Rods, of which the following is a specification.

The cutting plate that constitutes the subject matter of the present invention is designed for forming bearing pins, studs and the like and the teeth that serve for cutting or reducing the pin or stud to the proper size are made by forming in the surface of the plate concentric grooves leaving corresponding sharp elevations in combination with sockets or pockets formed through or in the plate and the diameter of said sockets corresponding to the desired thickness of the pin or stud.

The new cutting plate can be used in different combinations and for manufacturing of single studs or bearing pins or also by pairs, the one opposite the other.

In annexed drawings: Figure 1— shows a top view of the plate. Fig. 2— is a section of Fig. 1 on the line $x.\ x.$ while Fig. 3— shows a side view of the same. Fig. 4— shows the cutting plates as used in a boring machine for the manufacture of single studs, while Figs. 5—, 6—, 7— and 8— represent the combination of two cutting plates for manufacturing studs arranged on one piece of metal the one opposite the other as is found in watch bows or hoops. Fig. 9— is a section through the boring openings giving the first cutting. Fig. 10— is a watch bow upon which it is intended to form bearing studs. Fig. 11— shows the same with the studs as formed therein.

The cutting plate represented in Figs. 1—3, can, as shown in Fig. 4— be used in a boring machine or after having been properly fixed in the support of a lathe. The upper surface of the cutting plate A is provided with sharp concentric elevations or ribs $a$ and with corresponding grooves $a'$, and contains one or more sockets $b$ which are flared toward the upper part of the plate A and are provided at the inside with teeth $c$. The socket $b$ makes the first cutting of the stud while to make the second cutting I place the stud in the smooth opening $d$ which is smaller or larger according to the desired thickness of the stud so as to make it there into a smooth, well finished stud.

The staff or rod B that must be provided with a stud or reduced end is placed in the chuck $e$ of a boring machine C just as the drill is usually placed, and it is forced against the cutting plate A (Fig. 4) until a stud $f$ of the desired length is obtained.

If it is desired to manufacture studs located on the same piece or bow, I use two cutting plates A A' arranged upon one shaft or axle (Figs. 5 to 8—) which plates are provided with elevations or ribs and grooves $a\ a'$ at their outside and are under spring pressure for manufacturing two studs, the one opposite the other, and this spring pressure is such that the two plates are driven from each other, (Fig. 7.) The cutting plate A' is fixed in a frame $g$ which contains a spring $h$ that presses against the axle $i$ of the cutting plate A. The axle $i$ is held and guided by a pin $l$ working in a slot $k$ of the frame $g$.

In order to cut the studs, the watch bow D or rather its extremities $m, n,$ are placed into the sockets $b, c,$ Fig. 9, which commence the cutting, the watch bow being placed by pressing down the cutting plate A so far toward the plate A' that said buckle D catches around the two cutting plates as in Fig. 8. If the plate A is released the two extremities $m, n,$ of the buckle D will hold together the two cutting plates against the spring pressure, and the cutting will take place by to and fro motions of the buckle, after which the cutting of the taps $f$ will be finished by placing the same in the boring or openings $d,$ the diameter of which corresponds to the desired thickness of the stud.

The new cutting plate presents the great advantage that it is not only of very simple construction, but that by a corresponding use of its surfaces it is possible to manufacture studs of different diameters by using either one cutting plate or a combination of two of them.

Instead of the spring $h$, for pressing apart the cutting plates A, A', it is possible to use any device for placing the plates under pressure, in order that a constant pressure be exercised upon the extremities m, n, of the buckle when the taps f must be cut. It is possible for instance, to use for that purpose, a lever combination influenced by weights or a like device.

Having thus described my invention, what I claim as new, and desire to secure by Letters Patent of the United States, is—

1. A plate for cutting bearing studs or pins, having a series of concentric ribs with grooves between, the flaring openings b, provided with teeth and the openings d, substantially smooth extending through the ribbed surface of the plate, substantially as described.

2. A plate for cutting bearing studs or pins, having its surface provided with concentric ribs and grooves and the openings formed in the plate and through the ribbed surface, substantially as described.

3. In combination, the two cutting plates, having sockets or openings on their opposite faces for cutting the bearing studs or pins, said plates being arranged opposite each other, and the means for forcing the plates apart, substantially as described.

4. In combination, the two cutting plates arranged opposite each other and having cutting sockets on their opposite faces, the stem i on one plate fitting in an opening or socket of the other plate and the spring for forcing the plates apart, substantially as described.

In witness whereof I have hereunto set my hand in presence of two witnesses.

OSCAR OTTO ELSASSER.

Witnesses:
GUSTAV WILLNER,
BRUNO EBERTH.